US006060555A

United States Patent [19]
Wright

[11] Patent Number: 6,060,555
[45] Date of Patent: May 9, 2000

[54] SPRAYABLE ROOF COATING SYSTEMS

[76] Inventor: Winfield S. Wright, 1208 N. Grand, Roswell, N.Mex. 88201

[21] Appl. No.: 08/949,649

[22] Filed: Oct. 14, 1997

Related U.S. Application Data

[62] Division of application No. 08/379,278, Jan. 26, 1995, abandoned.

[51] Int. Cl.[7] ............................ C08L 33/08; C08L 33/02; C08K 3/20; C08K 3/26

[52] U.S. Cl. .......................... 524/522; 427/340; 427/421; 427/426; 524/413; 524/425; 524/426; 524/427; 524/432; 524/522; 524/320

[58] Field of Search .................................... 524/413, 425, 524/426, 427, 432, 497, 522, 320; 427/340, 421, 426

[56] References Cited

U.S. PATENT DOCUMENTS 5,234,988 8/1993 Brooks et al. .......................... 524/523

*Primary Examiner*—Peter A. Szekely
*Attorney, Agent, or Firm*—Martin L. Stoneman

[57] ABSTRACT

Improved sprayable roof coating systems which provide immediate waterproofing of a newly-sprayed latex-based ionic roof coating by applying to the upper surface of such roof coating an ionic catalyst having a pH opposed to the pH of such roof coating, whereby such upper surface of such roof coating coagulates immediately to form a thin waterproof surface layer on such roof coating and the bottom portions of such roof coating are permitted to coagulate and bond to the underlying roof normally. Also, latex-based sprayable roof coating systems permitting use in roof mastics of recycled rubber and spray equipment for such systems which do not clog up when air spraying such recycled-rubber-containing roof mastics.

6 Claims, 5 Drawing Sheets

FIG. 1
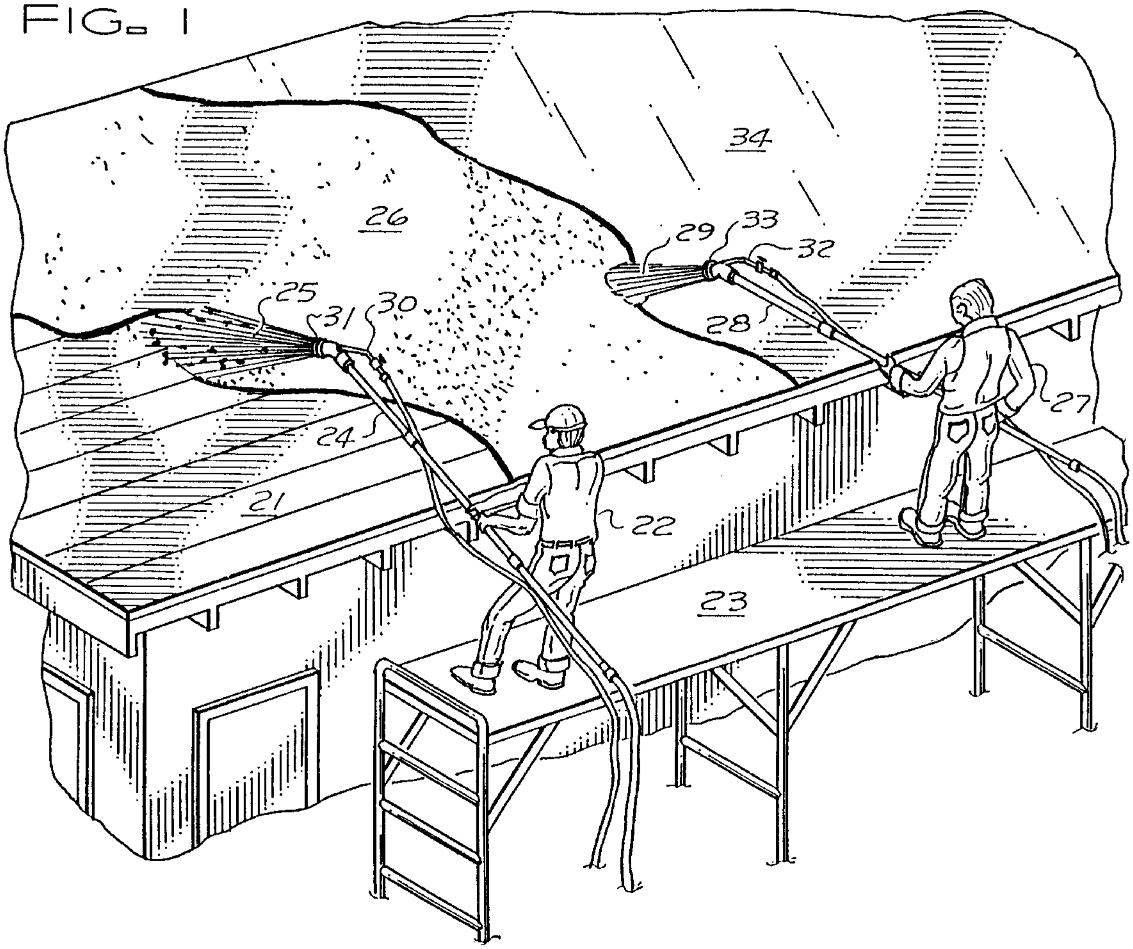
FIG. 2
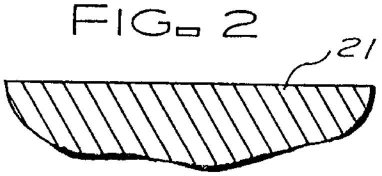
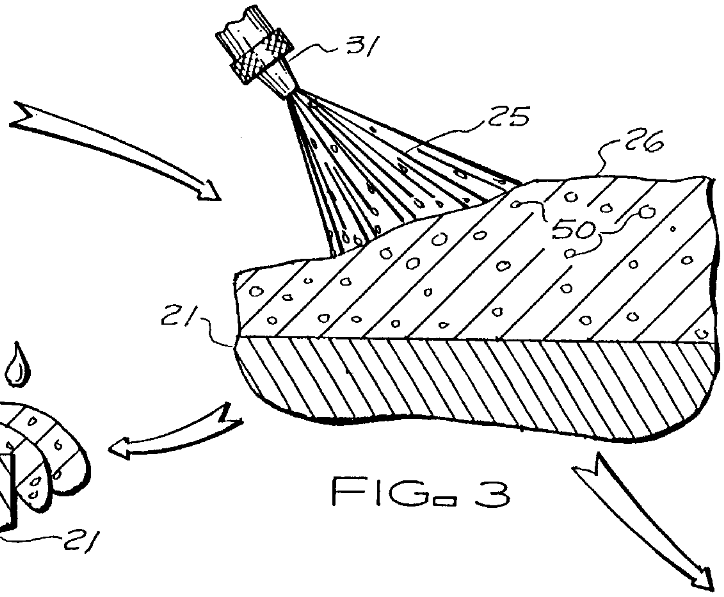
FIG. 3
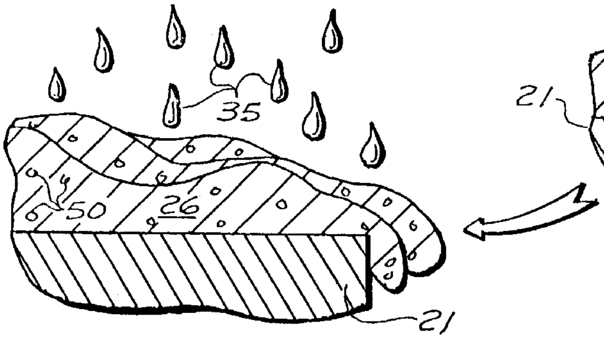
FIG. 4

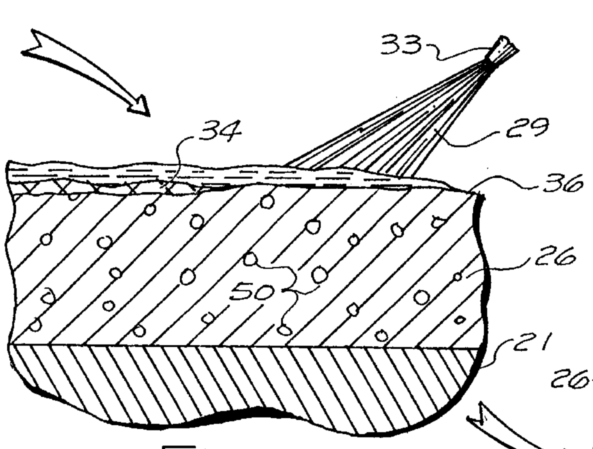
FIG. 5
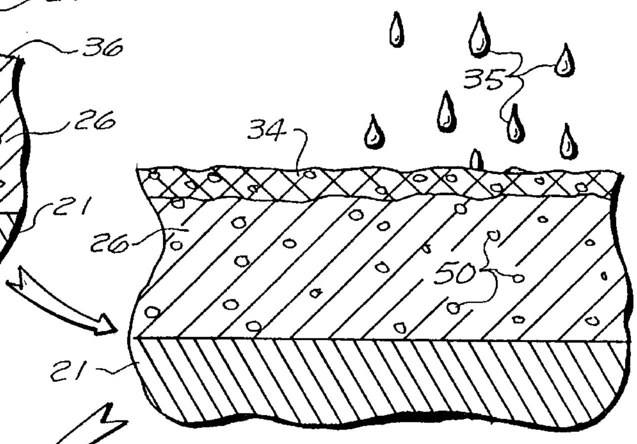
FIG. 6
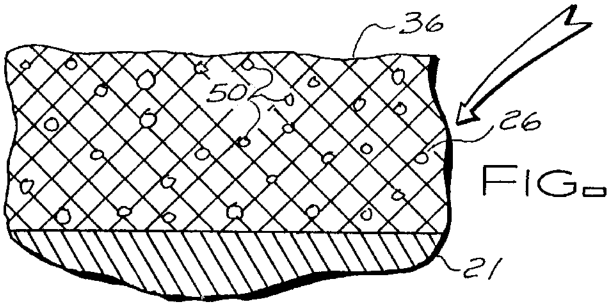
FIG. 7
FIG. 8
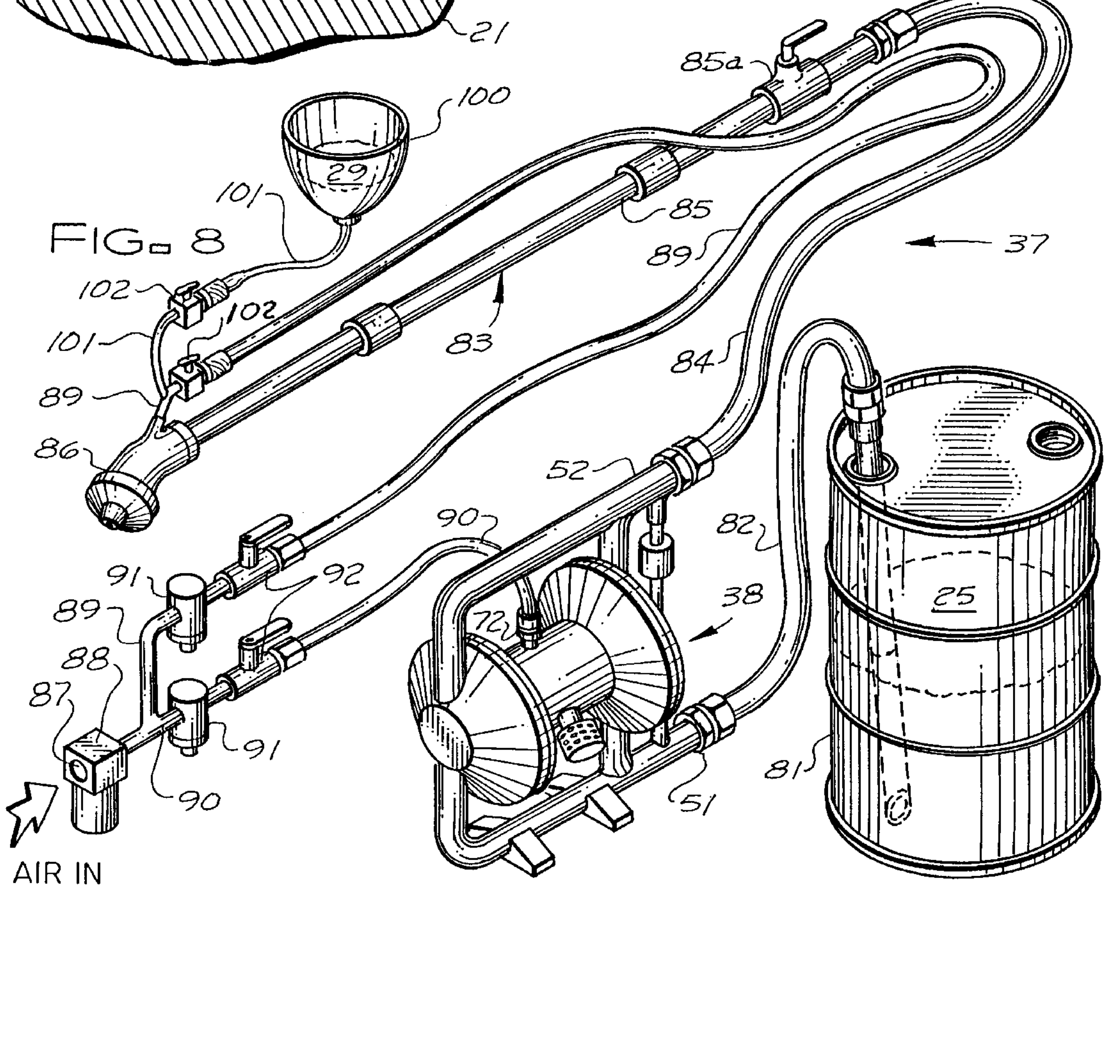

| TOTAL GALLONS | | 775 |
|---|---|---|
| TOTAL LBS. | | INGREDIENTS |
| | GRIND: | |
| (125) | | WATER (GALLONS) |
| 11 | | WATER CONDITIONER -Potassium Tripolyphosphate |
| 38 | | DISPERSING AGENT |
| 29.10 | | DEFOAMER -Silicone Organic Defoamer |
| 200 | | ZINC OXIDE |
| 800 | | TITANIUM DIOXIDE |
| 3400 | | CALCIUM CARBONATE |
| 16.36 | | MILDEWCIDE |
| | LETDOWN: | |
| 33 | | THICKENING AGENT |
| 140.4 | | ETHYLENE GLYCOL |
| 3723.8 | | LATEX (Acrylic) |
| 39.55 | | COALESCING AGENT -2,2,4-Trimethyl 1,3-Pentanediol, Monoisobutyrate |
| 25 | | AMMONIUM HYDROXIDE |

FIG. 11

| TOTAL GALLONS | | 770 |
|---|---|---|
| TOTAL LBS. | | INGREDIENTS |
| | GRIND: | |
| (125) | | WATER (GALLONS) |
| 3 | | WATER CONDITIONER -Potassium Tripolyphosphate |
| 46.13 | | DISPERSING AGENT |
| 29.10 | | DEFOAMER -Silicone Organic Defoamer |
| 100 | | ZINC OXIDE |
| 400 | | TITANIUM DIOXIDE |
| 3650 | | CALCIUM CARBONATE |
| 16.36 | | MILDEWCIDE |
| | LETDOWN: | |
| 15 | | THICKENING AGENT |
| 64.96 | | ETHYLENE GLYCOL |
| 3825 | | LATEX (Acrylic) |
| 39.55 | | COALESCING AGENT -2,2,4-Trimethyl 1,3-Pentanediol, Monoisobutyrate |
| 25 | | AMMONIUM HYDROXIDE |
| 43.05 | | LIQUID THICKENER |

FIG. 12

| TOTAL GALLONS | | 775 |
|---|---|---|
| TOTAL LBS. | | INGREDIENTS |
| | GRIND: | |
| (125) | | WATER (GALLONS) |
| 11 | | WATER CONDITIONER -Potassium Tripolyphosphate |
| 38 | | DISPERSING AGENT |
| 29.10 | | DEFOAMER -Silicone Organic Defoamer |
| 200 | | ZINC OXIDE |
| 800 | | TITANIUM DIOXIDE |
| 3400 | | CALCIUM CARBONATE |
| 16.36 | | MILDEWCIDE |
| | LETDOWN: | |
| 33 | | THICKENING AGENT |
| 140.4 | | ETHYLENE GLYCOL |
| 3723.8 | | LATEX (Acrylic) |
| 387.5 | | GROUND LIGHT RUBBER A (Atlas Rubber) |
| 387.5 | | GROUND LIGHT RUBBER B (Atlas Rubber) |
| 39.55 | | COALESCING AGENT -2,2,4-Trimethyl 1,3-Pentanediol, Monoisobutyrate |
| 25 | | AMMONIUM HYDROXIDE |

FIG. 13

| TOTAL GALLONS | | 440 |
|---|---|---|
| TOTAL LBS. | | INGREDIENTS |
| | GRIND: | |
| (55) | | WATER (GALLONS) |
| 23 | | DISPERSING AGENT |
| 1485 | | CLAY MODIFIED ASPHALT |
| 14.26 | | DEFOAMER -Silicone Organic Defoamer |
| 700 | | RUBBER -#5 BUFFINGS (Baker Rubber) |
| 200 | | RUBBER -#WRF-20 (Baker Rubber) |
| 50 | | CORD -Tire Cord (Baker Rubber) |
| 23.72 | | MILDEWCIDE |
| | LETDOWN: | |
| 65 | | COALESCING AGENT -2,2,4-Trimethyl 1,3-Pentanediol, Monoisobutyrate |
| 690 | | LATEX |
| 17.96 | | AMMONIUM HYDROXIDE |
| 48.22+ | | THICKENING AGENT |

FIG. 14

SPRAYABLE ROOF COATING SYSTEMS

This is a division of application Ser. No. 08/379,278 filed Jan. 26, 1995, now abandoned.

BACKGROUND OF THE INVENTION

1. Field of the Invention

This invention relates to improvements in sprayable roof coating systems and, more particularly, to improvements in providing sprayed roof coatings of the type which include a latex-emulsion binder.

2. Description of the Prior Art

As is well-known, emulsions are intimate mixtures of two immiscible liquids, one of them being dispersed in the other in the form of fine droplets. A mixture of two miscible liquids, water and alcohol, for example, will not produce an emulsion, but a more intimate degree of dispersion, a solution. On the other hand, it is not possible to form an emulsion with two immiscible liquids alone, since such a system would lack stability. When water is mixed with toluene, for instance, the two liquids will quickly separate.

The conditions change completely when a dilute soap solution, instead of straight water, is mixed with an oil. A milky liquid develops and remains stable for a considerable length of time, forming a typical emulsion. Thus three components are necessary to produce emulsions—two immiscible liquids and an emulsifying agent or emulsifier to create the emulsion and to keep it stable.

To the casual observer emulsions appear as uniform, opaque liquids or pastes of white or slightly yellowish color. The microscope reveals that emulsions are by no means uniform substances. They are non-uniform and consist of a multitude of small droplets or particles, usually of spherical shape, and varying diameter, floating in the surrounding liquid. Emulsions with particles of large diameter are called coarse emulsions, and those with small particles are fine emulsions. The particles and the liquids in which they float are referred to as the phases of an emulsions. The particles are the discontinuous phase, and the medium which is the dispersion liquid is called the continuous phase. Also, since the droplets of the discontinuous phase are enclosed from all sides, it is also called the internal phase, and the continuous phase is also called the external phase.

In most emulsions, one of the phases is water, or an aqueous solution containing salts, soluble organic material, colloids, etc. The continuous phase thus is also called the water phase. The discontinuous is often called the oil phase, even it does not consist of oil. Many substances constitute the oil phase, all having the important common property of insolubility in water. These substances include hydrocarbons, resins, waxes, nitrocellulose, alkyds, rubber, vinyls and acrylics. They are referred to as "oil" since they behave in emulsions much like oil.

The substances used in emulsions may be classified into two groups: those which enter the water phase, and those which go into the oil phase. The first group making up the aqueous portion must be water soluble, or show a certain affinity toward water. This group has the general name of hydrophilic substances. The other group of substances which go into the oil phase have no affinity for water but rather are attracted to oil or oil-like material. They are known as hydrophobic substances. Typical hydrophilic substances are water-soluble compounds, many metal salts, and substances containing a relatively large number of oxy- or hydroxyl groups. Typical hydrophobic substances are oils, fats, waxes, and all compounds containing mainly carbon with few or no polar groups. This difference is important in the selection of other materials which will be blended with the emulsion, such as pigments, fillers, cement, sand, and all other ingredients which may go into the making of a mastic or concrete or mortar or other material desired. The characteristic properties of an emulsion are dictated by the external phase. If water is the external phase (oil-in-water emulsion), the emulsion may be diluted with water and not with oil or organic solvents. The opposite is true with a (water-in-oil emulsion) emulsion, which must be thinned with organic solvents. If water is added, the viscosity will increase rather than decrease. Indeed, this is one way of visually distinguishing between the two types. Thinning with water will indicate an oil-in-water emulsion if viscosity decreases. An increase in viscosity would indicate a water-in-oil emulsion.

Many types of emulsifying agents are used in preparing emulsions. Chemically they belong to different classes of compounds including salts, acids, bases, and esters. Physically, they are substances of medium molecular weight (above 300), and the molecules are of elongated shape and belong to the mixed polar/non-polar type. These emulsifying agents determine the type of emulsion produced and the particle size of the dispersed droplets.

The emulsions generally used in mastics and cementitious compositions are of the oil-in-water type, and sometimes contain more than 50 percent water. They are nevertheless oil-in-water emulsions, and are stable in the presence of the various salts and oxides comprising the cement. Not all emulsions are compatible with cement, and to select an emulsion primarily intended for production of paint or adhesives to act as an admixture for a cementitious mortar would be an error.

Latex emulsion systems are frequently used as the binder in mastic and cementitious mixtures. The internal or disperse phase in a latex system is a polymeric material comprised of spherically-shaped particles with diameters in the range of 200–300 nm; and the external phase or dispersion medium is usually aqueous phase. As is mentioned hereinafter, such particles are usually kept from normally aggregating by electrostatic repulsion between such particles due to the presence of ionic charge at the surface of such particles.

Emulsion polymerization refers to a unique process employed for some radical chain polymerizations. It involves the polymerization of monomers which are in the form of emulsions. [The process is not similar to suspension polymerization, but is quite different in its mechanism and reaction characteristics.] Emulsion polymerization differs from suspension polymerization in the type and smaller size of the particles in which polymerization occurs and the kind of initiator employed. Emulsion polymerization was first employed for the production of synthetic styrene-butadiene rubbers during the 1940's when the supplies of natural rubber were cut off during World War II. Conjugated dienes such as butadiene and isoprene are presently polymerized and copolymerized in large part by the emulsion process. In addition, emulsion polymerization is also used extensively for vinyl acetate, vinyl chloride, acrylates, methacrylates, and various copolymers of these monomers.

The emulsion polymerization process has several distinct advantages. The physical state of the emulsion system makes it easy to control the process. Thermal and viscosity problems are much less significant than in bulk polymerization. The products of emulsion polymerizations can in some instances be employed directly without further separations but with appropriate blending operations. Such applications involve coatings, finishes, floor polishes, and paints. Aside from the physical difference between the emulsion and other polymerization processes, there is one very significant kinetic difference. For the other processes, there is an inverse relationship between the polymerization rate and the polymer molecular weight. This drastically limits one's practical ability to make large changes in the molecular weight of a polymer. Large increases in molecular weight can only be make by decreasing the polymerization rate by lowering the initiator concentration or lowering the reaction temperature. Emulsion polymerization is a unique process in that it affords a means of increasing the polymer molecular weight without decreasing the polymerization rate. Because of a different reaction mechanism, emulsion polymerization has the advantage of being able to simultaneously attain both high molecular weights and high reaction rates. To a large extent, the molecular weight and polymerization rate can be varied independently of each other.

As is well-known, the main components of an emulsion polymerization system are the monomer(s), dispersing medium, emulsifying agent, and water-soluble initiator. The dispersing medium is the liquid in which the various components are dispersed in an emulsion state by means of the emulsifying agent. The dispersing medium is usually water. The emulsifying agent is a surfactant whose action is due to its having both hydrophilic and hydrophobic segments in its molecular structure. Various other components may also be present in the emulsion system.

Also, as is well-known, for ionic latex emulsions, the surface charges at each particle (provided by the surfactant) assist in keeping the emulsion dispersed because of the electrostatic repulsion between the particles. This repulsion may be from cationic or from anionic charges; and the ways of using appropriate surfactants to maximize the dispersion of the emulsion by appropriate electrostatic repulsion between the particles of the emulsion are well-known. Additionally, it is known that an ionic emulsion may be coagulated (through aggregation of the separate particles and polymerization) by the addition of surfactants or electrolyte with opposite charge to the ions used to stabilize the latex particles. Additionally, it is known that coatings which contain ionic latex emulsions as the binder should have a controlled pH for best dispersion, i.e., maintaining the ionic electrostatic repulsion. For example, if a cationic latex emulsion is used as a binder (with pigments, etc.) in a mastic, the mastic should be maintained with a high pH.

Also, typically, water-based latex roof mastics may be placed on roofs in several manners, e.g., troweled, sprayed, etc. For such roof mastics of low enough viscosity to be sprayed (typically by air spray gun), the cure time is long enough (many hours or days) that there is often a chance for rain while the water-based latex roof mastic is not yet cured. It is noted that even if the cure time for sprayed coatings would be drastically reduced, thus reducing the chances for rain damage, there would be introduced new problems such as maintaining good adhesion of the coating to the base.

Addition of water to sprayed roof coating by raindrops typically softens the mastic to the point where it runs and destroys the integrity of the roof coating. Thus, in rainy-weather areas or other areas where rain may come shortly, roof spraying with such latex-based coatings is avoided even where it is otherwise the best coating to use for the job in terms of economics, long life, efficiency, etc. Thus, there have existed needs for sprayable latex-based roof coating systems which may be used in wet weather.

Furthermore, there have existed needs for sprayable economical latex-based roof coatings which are exceptionally resilient and long-wearing, both for use in dry areas and for use in wet areas. The inclusion in latex-based roof coatings of the kinds of asphaltic and recycled-rubber ingredients which have been used to provide resilient and long-wearing properties on floors, roads, and walkways has not been in the past successfully accomplished. To economically use these materials in latex roof coating systems, spraying is necessary. Thus, there exists a need for such sprayable resilient and long-wearing latex-based roof coatings.

The usual spray systems used in roof coating systems do not work efficiently with such materials (i.e., latex-based coatings including asphaltic and recycled-rubber ingredients). One major problem is that the usual air spray systems used currently in roof coating tend to clog and spray inefficiently (or not at all) when spraying such materials including such asphaltic and recycled-rubber ingredients. Thus there exists a need in roof coating systems for spraying systems which overcome such disadvantages.

OBJECTS OF THE INVENTION

Thus, the foregoing referred-to drawbacks and disadvantages of prior roof coating systems have not been met and overcome in the prior art roof coating systems, and it is the primary object of the invention herein, a preferred form of which is described in detail hereinafter, to overcome the said disadvantages and drawbacks and to provide significant capabilities not previously available.

It is a further object of this invention to provide an improved roof coating system which permits the use of water-based latex-emulsion-bound roof coatings in wet weather, even in the face of raindrops, yet does not interfere with other valuable properties of such coatings, such as good adhesion to the underlying material.

Another object of this invention is to provide sprayable economical latex-based roof coatings which are exceptionally resilient and long-wearing, both for use in dry areas and for use in wet areas, even including therein the kinds of asphaltic and recycled-rubber ingredients which provide such benefits in floor coatings.

Yet another object of this invention is to provide spraying systems which permit sprayable roof coating systems to include such asphaltic and recycled-rubber ingredients.

SUMMARY OF THE INVENTION

According to the foregoing objectives, this invention provides a roof coating system comprising: applying a roof coating by spraying a roof mastic having an ionic latex emulsion binder and an emulsion-stabilizing pH; and, shortly thereafter, inducing an immediate thin coagulated waterproof layer on such roof coating by applying upon such roof coating an ionic liquid having a pH opposite to such emulsion-stabilizing pH of such roof mastic. And the present invention further provides such a roof coating system wherein such applying upon such roof coating of such ionic liquid is done by spraying; and wherein such ionic latex emulsion binder is cationic and such ionic liquid is anionic; and wherein such roof mastic has a pH of about 11.0; and wherein such roof mastic has a pH of from about 10.75 to about 11.5. Further provided according to the present invention is such roof coating system wherein such ionic liquid comprises citric acid; and wherein such ionic liquid is formulated by mixing about 75% by volume of water with 25% by volume of citric acid. Additionally, there is provided such roof system including a last step of permitting such roof coating to cure, whereby a fully-coagulated roof coating is formed, including provision of a roof coating resulting thereby. Also provided by this invention is such roof coating system wherein such roof mastic comprises particles of recycled rubber; and wherein such roof mastic includes from about one to about two pounds per gallon of recycled rubber particles.

Yet additionally, according to the present invention, there is provided such roof coating system wherein the spraying of such roof mastic is done by use of spray equipment comprising: source means for providing a supply of roof mastic; pump means for pumping such roof mastic at a pressure of at least about 50 psi; first conduit means for permitting flow of such roof mastic from such source means to such pump means; spray means for spraying such roof mastic; and second conduit means for permitting flow of such roof mastic from such pump means to such spray means.

This invention also provides a method of providing immediate waterproofing of a newly-sprayed latex-based ionic roof coating, comprising the step of applying to the upper surface of such roof coating an ionic catalyst having a pH opposed to the pH of such roof coating, whereby such upper surface of such roof coating coagulates immediately to form a thin waterproof surface layer on such roof coating and the bottom portions of such roof coating are permitted to coagulate and bond to the underlying roof normally.

And the present invention provides a roof coating system comprising a sprayable roof mastic mixture consisting essentially of: latex emulsion; recycled rubber particles; and an extender selected from the class consisting of mineral fillers and asphalt. Such roof coating system is further provided wherein such sprayable roof mastic mixture includes at least about one pound to about two pounds of such recycled rubber particles per gallon of such mixture; and, further, wherein such sprayable roof mastic mixture is sprayed onto a roof as a coating. And such system is further provided wherein such spraying is done using spraying equipment comprising: source means for providing a supply of roof mastic; pump means for pumping such roof mastic at a pressure of at least about 50 psi; first conduit means for permitting flow of such roof mastic from such source means to such pump means; spray means for spraying such roof mastic; and second conduit means for permitting flow of such roof mastic from such pump means to such spray means. Also provided is such roof coating system wherein asphalt is the extender and wherein the recycled rubber particles consist essentially of tire rubber, including provision of the product resulting therefrom; and, further, wherein mineral fillers are the extender and wherein the recycled rubber particles consist essentially of tennis shoe and tennis ball rubber, including provision of the product resulting therefrom. Additionally provided by this invention is such roof coating system wherein the recycled rubber particles consist essentially of: from ground tire rubber, elongated pieces about ½" long passing through a #5 mesh; from ground tire rubber, particles passing through a #20 mesh; and from ground tire cord, particles passing through a ¼" mesh.

Even further, according to the present invention, there is provided a roof coating system comprising a spraying system including: source means for providing a supply of sprayable roof mastic; pump means for pumping such sprayable roof mastic; first conduit means for permitting flow of such sprayable roof mastic from such source means to such pump means; spray means for spraying such sprayable roof mastic; and second conduit means for permitting flow of such sprayable roof mastic from such pump means to such spray means; and, further wherein such pump means comprises a positive displacement pump; and, even further, wherein such spray means comprises an air spray gun; and yet further, wherein any valves and conduits within such positive displacement pump are large enough in size to transport without clogging a such sprayable roof mastic containing up to about three pounds per gallon of rubber pieces each up to about ½" long.

Additionally, this invention provides a roof coating system including providing a sprayable roof coating material comprising a latex emulsion and an ingredient selected from the class consisting essentially of mineral fillers and asphalt; and providing a sprayable waterproofing-inducing liquid having a pH opposite to that of such sprayable roof coating material.

BRIEF DESCRIPTION OF THE DRAWINGS

FIG. 1 is a pictorial illustration, in perspective, showing a preferred embodiment of the roof coating system of the present invention, illustrating a roof being coated according to such embodiment.

FIG. 2 is a partial sectional view of a roof (such as shown in FIG. 1) before any coating has been done.

FIG. 3 is a view, partially in section, of the roof of FIG. 2, shown being coated by spraying on of a roof mastic according to a preferred embodiment of the present invention.

FIG. 4 is a view, partially in section, of the sprayed roof of FIG. 3, shown shortly after spraying thereon of roof mastic, when being impinged upon by raindrops.

FIG. 5 is a view, partially in section, of the sprayed roof of FIG. 3, shown immediately after spraying thereon of a coating of roof mastic according to a preferred embodiment of the present invention, when such coating is being sprayed by a catalyst according to a preferred embodiment of the present invention.

FIG. 6 is a view, partially in section, of the sprayed roof of FIG. 5, shown immediately after spraying onto the roof mastic coating of the catalyst of the present invention, when being impinged by raindrops.

FIG. 7 is a sectional view of the coated roof shown in FIG. 6, shown after complete curing of the coating according to a preferred embodiment of the present invention.

FIG. 8 is a pictorial illustration, in perspective, of a spraying system according to a preferred embodiment of the present invention.

FIG. 11 illustrates a recipe, in form familiar to those skilled in the art, for the mixing of a roof mastic according to a preferred embodiment of the roof coating system of the present invention.

FIG. 12 illustrates another recipe, in form familiar to those skilled in the art, for the mixing of a roof mastic according to a preferred embodiment of the roof coating system of the present invention.

FIG. 13 illustrates another recipe, in form familiar to those skilled in the art, for the mixing of a roof mastic according to a preferred embodiment of the present invention.

FIG. 14 illustrates another recipe, in form familiar to those skilled in the art, for the mixing of a roof mastic according to a preferred embodiment of the present invention.

DETAILED DESCRIPTION OF PREFERRED EMBODIMENTS AND THE BEST MODE OF PRACTICE

Figure 9:
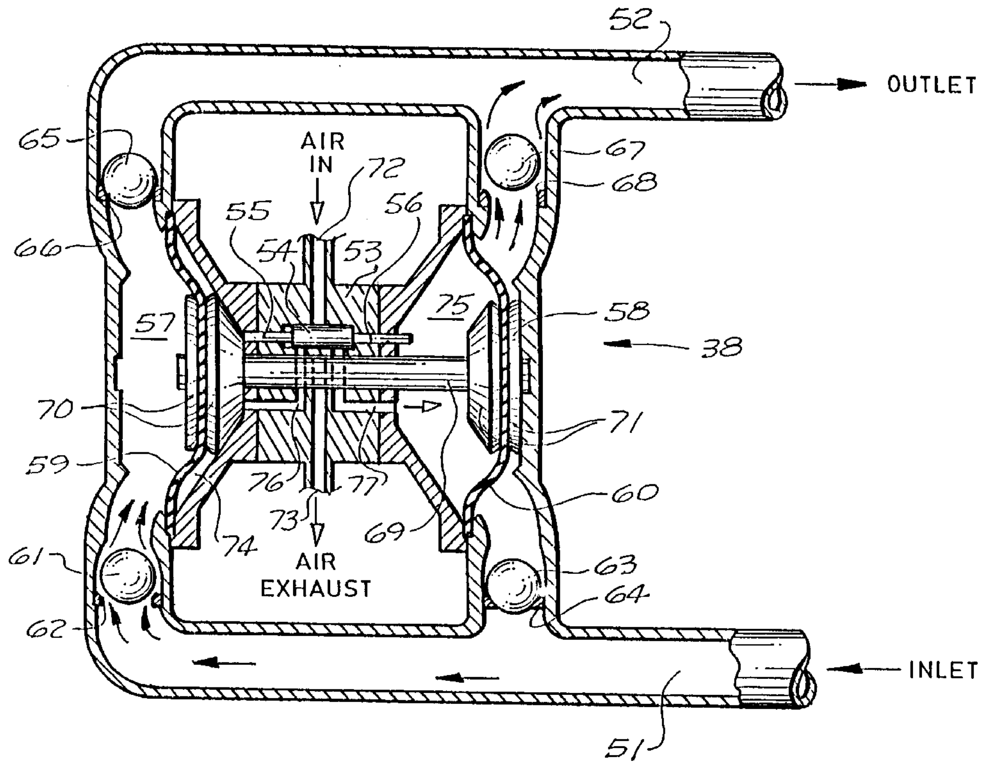
FIG. 9 is a front right view, partially in section, of the pump means shown in FIG. 8, the section being through the conduit means to and from such pump means.

FIG. 1 is a pictorial illustration, in perspective, showing a preferred embodiment of the roof coating system of the present invention, illustrating a roof 21 being coated according to such embodiment. Shown is a worker 22, being supported by worker support structure 23, using spraying equipment 24 to spray roof mastic 25 (made with a water-based latex binder in accordance with this invention as described elsewhere herein) onto roof 21 in a generally right to left direction, thus making a roof mastic coating 26 on roof 21. Another worker 27, also being supported by worker support structure 23, is shown using spraying equipment 28 to spray a catalyst 29 (prepared in accordance with the present invention as elsewhere described herein) onto roof mastic coating 26 shortly after the spraying thereof by worker 22, worker 27 also being shown working in a generally right to left direction. Air hose 30 is attached to the spray end 31 of spraying equipment 24 in a well-known manner for air spray guns. Similarly, air hose 32 is attached to the spray end 33 of spraying equipment 28 in a well-known manner for air spray guns. As the catalyst 29 being sprayed upon roof mastic coating 26 by worker 27 comes into contact with roof mastic coating 26, the catalyst 29 (as elsewhere herein described) induces immediate coagulation of the surface of roof mastic coating 26 to form a thin waterproof surface layer 34 on roof mastic coating 26. Spraying equipment 24 may, as is hereinafter described, be part of the spraying system shown in detail in FIG. 8.

FIG. 2 is a partial sectional view of a roof 21 before any coating has been done. As is well-known in the art, roof 21 will be cleaned and otherwise prepared to receive a coating in a manner dependent in detail upon the roof material of the roof 21 to be coated.

FIG. 3 is a view, partially in section, of roof 21 shown being coated by spraying on through spray end 31 (of spray equipment 24) of roof mastic 25 according to a preferred embodiment of the present invention. As shown, when sprayed upon roof 21, roof mastic 25 forms roof mastic coating 26 upon roof 21. It is noted that, in FIGS. 3 through 7, the thickness of roof mastic coating 26 is exaggerated for purposes of illustration; the actual thickness is a fraction of an inch, similar to that of other well-known mastics prepared with a latex emulsion binder and sprayed. Similarly, the viscosity of sprayable roof mastics according to the present invention is in well-known ranges, i.e., high enough to form a coating, and low enough that gravity maintains a horizontal coating with similar thickness throughout each area.

FIG. 4 is a view, partially in section, of roof 21 shown shortly after spraying thereon of roof mastic 25 (made with a water-based latex as a binder) to form roof mastic coating 26. As shown, and as is well-known in the roofing industry, when being impinged upon by raindrops 35, freshly-coated roof mastic coating 26, which has had no chance to cure, becomes watery and loses its integrity as a coating.

FIG. 5 is a view, partially in section, of roof 21 shown immediately after spraying thereon of roof mastic coating 26 according to a preferred embodiment of the present invention, when such coating 26 is being sprayed by a catalyst 29 according to a preferred embodiment of the present invention.

In the sprayable roof mastics used according to the present invention, an ionic latex emulsion is used as the binder, and the latex remains stabilized by electrostatic repulsion of the particles therein by maintaining the pH of the roof mastic within desired ranges. Catalyst 29 is an ionic liquid of opposite pH to that of the roof mastic; and it has been discovered that application by spraying of such catalysts to the surface of such a roof mastic coating "shocks" the surface of the coating in such manner as to sufficiently destroy the electrostatic stabilization of a thin surface portion of the roof mastic coating to produce coagulation and polymerization within such thin surface portion of the roof mastic, forming an immediate thin waterproof surface layer. However, importantly, the "shocked" layer of the roof mastic coating does not ordinarily affect the bottom portions of the roof mastic coating, permitting relatively normal curing and coagulation/aggregation of such bottom portions in well-known ways to provide desired properties and to form desired adhesions to the underlying roof portions. In this manner, catalyst 29 quickly interreacts with the surface 36 of coating 26.

FIG. 6 shows the sprayed roof 21 immediately after spraying onto the roof mastic coating 26 of the catalyst 29 of the present invention, when being impinged by raindrops 35. As shown, catalyst 29 has quickly interreacted with the surface 36 of roof mastic coating 26 to form thin waterproof surface layer 34, so that raindrops 35 fall harmlessly onto thin waterproof layer 34 and are thereby prevented from destroying the integrity of the underlying portions of roof mastic coating 26. Thus, roof mastic coating 26 may continue to cure and coagulate in well-known manners. FIG. 7 shows roof 21 after complete curing of the coating 26 of the present invention which, as shown, has been protected from rain during curing by the waterproof layer 34 of the upper surface 36 of coating 26.

FIG. 8 shows a spraying system 37 constructed according to a preferred embodiment of the present invention, which will be further described in detail hereafter after description of the roof mastics of the present invention for which such spraying system 37 are especially advantageous; and FIG. 9 shows the pump means 38 of spraying system 37 in detail.

Figure 10:
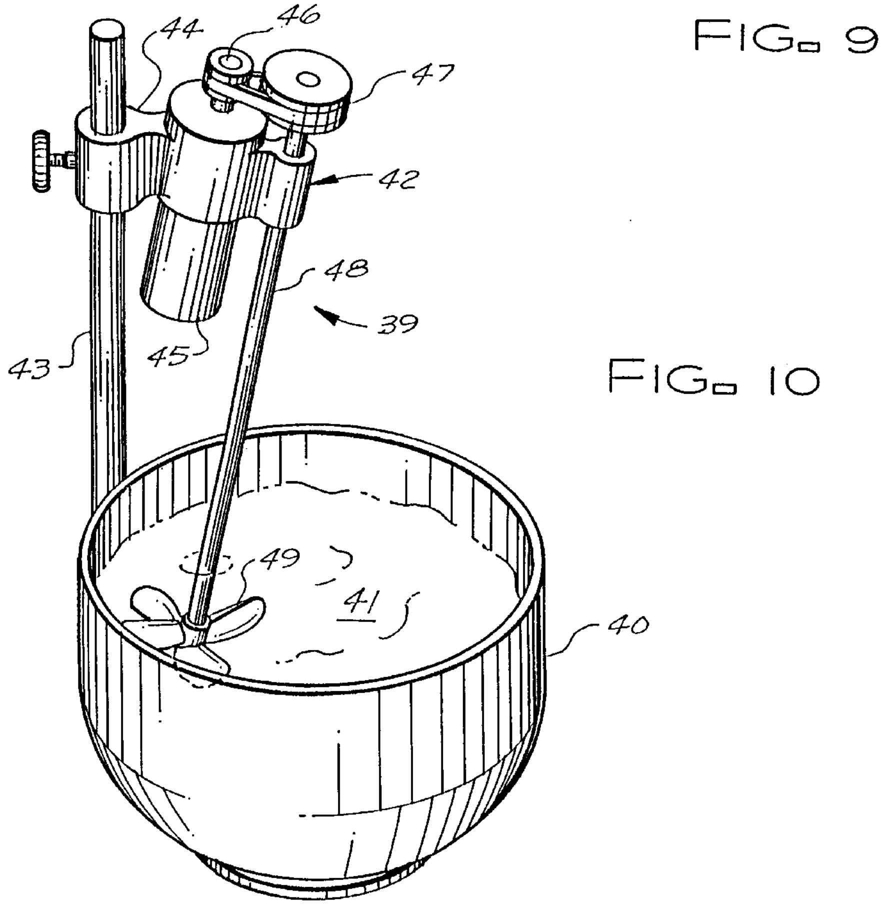
FIG. 10 is a pictorial illustration, in perspective, of a representative mixing system which may be used in making a roof mastic according to a preferred embodiment of the present invention.

FIG. 10 shows a representative mixing system 39 which may be used in making roof mastics 25 according to preferred embodiments of the present invention. Shown is mixing kettle 40, which may contain roof mastic ingredients 41 as hereinafter described. Mixer-grinder 42, of a well-known type, contains base support 43, to which are connected, through attachment support 44, motor 45, motor shaft 46, pulley-drive 47, and driven shaft 48. Motor 45 drives pulley-drive 47, which drives shaft 48. Shaft 48 has connected at its lower end mixer-grinder wheel 49 which, when placed within the ingredients 41 within kettle 40, may be rotated at a selected speed in well-known ways to perform mixing or grinding of ingredients 41.

FIG. 11 illustrates a recipe, in form familiar to those skilled in the art, for the mixing of one representative roof mastic according to a preferred embodiment of the roof coating system of the present invention. According to the present habit and nomenclature of those skilled in the present arts, in mixing mastics for use in coatings, the earliest ingredients which go into a mixing kettle, especially when such ingredients require a time for mixing or high-speed grinding, are called the GRIND. After all of such initial ingredients are added and any necessary high-speed grinding and/or mixing is accomplished (as is well-known in the art), the then-added later ingredients, which include any latex binder, to be slowly blended in the kettle, are called the LETDOWN.

For the cationic latex mastic of FIG. 11, for example, the following approximate manufacturing procedure is recommended when using the proprietary acrylic latex (known as "Rhoplex EC-1791") of Rohm and Haas Company: (1) charge the water, the water conditioner, the dispersing agent, and the defoamer of the GRIND to the mixing kettle; (2) while mixing at slow speed, add the mineral fillers (zinc oxide, titanium oxide, calcium carbonate) and the mildewcide to the kettle; (3) After all the mineral fillers are in the kettle, stop the mixer and scrape the side and bottom of the kettle; (4) Turn the mixer back on and grind at high speed for 15–30 minutes, or until a good grind is obtained (Hegman reading of 4.5–5.0); (5) slow the mixer to its slowest speed; (6) for the LETDOWN, add the ammonium hydroxide and then the latex and the other LETDOWN ingredients, making sure the ethylene glycol and thickening agent are added quickly (at most within about five minutes) after the ammonium hydroxide (or necessary thickening time may drastically increase; (7) Note—since this example roof mastic includes a cationic latex binder and, according to this preferred embodiment of the present invention, this sprayable roof mastic will be used with a sprayable catalyst preferred to be a 25% solution of citric acid, care should be taken in well-known ways to finish, store and spray this mastic with the preferred pH reading of about 10.75 to about 11.5, it being highly preferred to have a pH of about 11.0 for best interaction with catalyst during spraying.

FIG. 12 illustrates another representative recipe, in form familiar to those skilled in the art, for the mixing of a cationic roof mastic according to a preferred embodiment of the roof coating system of the present invention. This example uses a proprietary acrylic latex (UCAR Latex 123) of Union Carbide Co. Again, the pH of the resulting sprayable mastic should be about 11.0 for best results with the sprayed catalyst (for best immediate waterproofing); and this sprayable roof mastic will preferably be used with a sprayable catalyst of a 25% solution of soda ash.

FIG. 13 illustrates a recipe, in form familiar to those skilled in the art, for the mixing of an improved sprayable roof mastic, according to a preferred embodiment of the present invention, which gives greatly improved characteristics (more resiliency, longer life, etc.). This mastic is light in color and produces a light-colored roof coating which is advantageous in sunny areas. Furthermore, this improved mastic may be used with a sprayed ionic catalyst like a 25% citric acid solution to form an immediate thin waterproof layer on the surface of a roof coating sprayed from this improved mastic, so as to offer rain protection during the cure period. Note that in this recipe, the ingredients ground light rubber A and ground light rubber B consist respectively of materials like recycled tennis shoes and recycled tennis balls; and these ingredients may be purchased from Atlas Rubber.

FIG. 14 illustrates another recipe, in form familiar to those skilled in the art, for the mixing of an improved sprayable roof mastic according to a preferred embodiment of the present invention. Thorough mixing of the GRIND takes a mix time of 30–45 minutes. This improved roof mastic has much more toughness and resiliency than ordinary mastics; and it too can be used (with proper pH of about 10.75 to about 11.5, of course, for best results) with a sprayed ionic catalyst like a 25% citric acid solution to form an immediate thin waterproof layer on the surface of a roof coating sprayed from this improved mastic, so as to offer rain protection during the cure period. Note that in this recipe, the following ingredients may be obtained from recycled tires and represent a particularly excellent use in roofing of these otherwise-hard-to-dispose-of materials; and these ingredients may be obtained from Baker Rubber: (1) RUBBER—#5 buffings consists of elongated pieces of about ½" each of recycled tire buffings which pass through a #5 mesh; (2) RUBBER—#WRF-20 consists of ground recycled-tire pieces passing through a #20 mesh; and (3) CORE—consists of ground recycled tire cord passing through a ¼" mesh. It is further noted, with respect to the roof mastic of FIG. 14, that thickening agent should be added until the viscosity is just high enough to keep the rubber solids in suspension in the mixing kettle; if the viscosity is permitted to be higher than this, the to-be-described pumping of the roof mastic will become more difficult.

Typically, in applying sprayed mastic coatings, a common air spray gun of well-known type is used. Typically, the mastic to be sprayed is supplied to the spray head through a pipe of about an inch in diameter, and an air hose is attached to the spray head to provide air under pressure to spray the supplied mastic in well-known ways. However, in spraying the roof mastics using recycled rubber pieces according to the present invention, such typical air spray guns can not do an efficient job due to the clogging or near-clogging of the supply pipe due to the presence of such rubber pieces in such roof mastic, especially the roof mastics of the present invention using recycled tires wherein pieces of tire rubber about ½ inch long are common.

It has been found that such described roof mastics with recycled rubber ingredients may be sprayed with a typical air spray gun spray head arrangement only if roof mastic supplied in the supply pipe leading to the spray head is supplied at a pressure of at least about 50 pounds per square inch. Such supply with a positive pressure prevents clogging or near-clogging of the supply pipe and permits efficient spraying of such roof mastics onto a roof. It has further been found that using improved spray equipment wherein a positive displacement pump supplies such roof mastic at such pressures to such air spray head eliminates such problems and works efficiently as spray equipment for spraying such recycled-rubber-containing roof mastics.

FIG. 8 illustrates a preferred embodiment of the spraying system 37 of the present invention. And FIG. 9 illustrates the well-known details of the pump means 38 which provides the desired pressures in supplying roof mastic to a spray head. With respect to the pump means 38 (see FIG. 9), inlet air enters reciprocating motor 53, through porting of reciprocating motor control valve spool 54, into right pumping chamber 75, forcing right diaphragm 60 to the far right activated position against outer wall of right pumping chamber (fluid side) 58. Such movement of right diaphragm 60 pulls diaphragm connecting shaft 69 to its full right position because of its attachment to right diaphragm holding plate 71. As right diaphragm holding plate 71 moves right, it pulls the attached left diaphragm holding plate 70 to its full right position. Movement of left diaphragm holding plate 70 and left diaphragm 59 forces air out of left pumping chamber (air side) 74, through left air port 76, through porting of reciprocating motor control valve spool 54 and out motor exhaust port 73. Left diaphragm holding plate 70 pushes left activating rod control valve spool 55 and its attached reciprocating motor control valve spool 54 to the right side of its travel within its ported cavity, also extending right activating rod control valve spool 56 into right pumping chamber (air side) 75. With reciprocating motor control valve spool 54 moved right, exhaust porting through left air port 76 and motor exhaust port 73 is blocked by reciprocating motor control valve spool 54. At that same time, inlet air, through air inlet 72, is allowed to enter left air port 76 through the opened port in reciprocating motor control valve spool 54. Air entering left pumping chamber (air side) through left air port 76 moves the assembly consisting of left diaphragm holding plate 70, right diaphragm holding plate 71, diaphragm connecting shaft 69, left diaphragm 59 and right diaphragm 60 to the left. This forces liquid (roof mastic in this use) in left pumping chamber (fluid side) 57 out through the left fluid outlet as left discharge check ball 65 is forced off of left discharge check ball seat 66. Left inlet check ball 61 is forced against left inlet check ball seat 62 prohibiting fluid flow into the inlet manifold. As right diaphragm 60 moves left, air within right pumping chamber (air side) 75 is forced through right air port 77, into the now opened port in reciprocating motor control valve spool 54, and out through air outlet 73. Enlarging of right pumping chamber (fluid side) 58, causes fluid inlet manifold 51 negative pressure, raising right inlet check ball 63 from its right inlet check ball seat 64, (right discharge check ball 67 is seated on right discharge check ball seat 68 by gravity), and allowing atmospheric pressure to push fluid through the inlet manifold and into right pumping chamber (fluid side) 58. When right diaphragm holding plate 71 contacts right activating rod control valve spool 56, it in turn begins to shift the valve spool to its opposite position, again reversing air flow and fluid pump movement. As is well known, alternating compressing of left and right fluid pumping chambers forces fluid out the pump outlet 52 developing flow and pressure proportional to the air supply pressure and volume. It is noted that the passages and check ball valves of pump means 38 through which mastic must flow must be of sufficient size to prevent clogging, for example, due to rubber pieces in the mastic. It has been found, for pumping the mastic described in FIG. 14, that hoses, passages, and valves of about two-inch diameter are sufficient for this purpose.

With respect to the spraying system 37 of FIG. 8, whose various elements are well-known but whose combinations and uses herein are new, there is described a preferred embodiment thereof. The illustrated source means provides drum 81, shown as containing a supply of the roof mastic 25 to be sprayed, which, for example, may be the recycled-ground-tire containing mastic whose manufacturing recipe is given in FIG. 14, which mastic contains pieces of rubber up to about ½ inch long, as previously described. Pump means 38 is connected to the interior holding portions of drum 81 by first conduit means 82 comprising a pipe or hose preferably about two inches in diameter extending from drum 81 to the fluid inlet manifold 51 of pump means 38. By operation of pump means 38, described specifically above with respect to FIG. 9, the mastic to be sprayed is pumped from the fluid outlet manifold 52 of pump means 38 at a pressure preferred to be at least about fifty pounds per square inch for mastics like the mentioned recycled-ground-tire containing mastic.

Spray means 83 (corresponding to the spraying equipment shown held by workers in FIG. 1) is connected to fluid outlet manifold 52 of pump means 38 by second conduit means 84, preferably comprising a hose about two inches in diameter. Spray means 83 preferably comprises a pipe 85 containing shut-off valve 85*a* along its length and a spray head 86 (well-known in the art of air spray guns for spraying mastic) at its end. Thus, a roof mastic 25 may be pumped at the selected pressure to the spray head 86, from where it is sprayed in well-known ways onto a roof.

Air pressure is required both by the illustrated pump means 38 and by spray head 86. Such air under pressure may be supplied from a common source through air line 87, through air filter 88, then branching into two air conduits 89 and 90, each containing an air regulator 91 and shut-off valve 92. Then air conduit 90 provides inlet air into air inlet 72 of pump means 38, whose operation has been herein described, and air conduit 89 provides air under pressure (through spray valve 91) to spray head 86, for operation of spray head 86 in well known ways.

Optionally (with reference to FIG. 8), a source of sprayable waterproof-inducing liquid (suitable to act as a catalyst 29 according to the present invention when sprayed upon a coating 26 of roof mastic 25) such as container 100 may be connected by a suitable conduit such as hose 101 to air conduit 89 adjacent spray head 86, as shown. Valve 102 serves to open or close the flow of such sprayable waterproof-inducing liquid 29 through hose 101 in a well-known manner. By using this option, a roof spray worker (such as worker 22 in FIG. 1) may first spray the roof mastic coating 26, then close valve 85*a* to stop the flow of mastic, then open valve 102 to start the flow of catalyst 29, and then immediately spray the catalyst 29. This will be especially advantageous for small jobs where it is desired to use one worker with one spray-equipment tool.

It is noted that, with reference to FIGS. 4 through 7, elements labeled with reference numbers 50 may be present and represent pieces of recycled rubber, as found when using roof mastics like those of FIGS. 13 and 14.

Further advantages of applicant's invention will be apparent to those skilled in the art from the above descriptions and the below claims.

What is claimed is:

1. A roof coating composition comprising a sprayable roof mastic mixture consisting essentially of:

a. an acrylic latex emulsion;

b. recycled rubber particles sized from about a #20 mesh to about a #5 mesh wherein the length of said particles is up to about ½-inch long; and c. an extender consisting of mineral fillers;

d. wherein said roof mastic has a pH of about 11.

2. The roof coating composition of claim 1 wherein said sprayable roof mastic mixture includes at least about one pound to about two pounds of said recycled rubber particles per gallon of said mixture.

3. The roof coating composition of claim 1 wherein mineral fillers are the extender and wherein the recycled rubber particles consist essentially of tennis shoe and tennis ball rubber.

4. The roof coating composition of claim 1 wherein:

a. said sprayable roof mastic mixture includes at least about one pound to about two pounds of said recycled rubber particles per gallon of said mixture; and b. mineral fillers are the extender and wherein the recycled rubber particles consist essentially of tennis shoe and tennis ball rubber.

5. A roof coating system comprising:

a. a sprayable roof mastic mixture consisting essentially of:

i. an acrylic latex emulsion;

ii. recycled rubber particles sized from about a #20 mesh to about a #5 mesh wherein the length of said particles is up to about ½-inch long;

iii. an extender consisting of mineral fillers;

iv. wherein said roof mastic has a pH of about 11.0; and b. an ionic liquid comprising about 25% by volume citric acid and having a pH opposite to that of said sprayable roof coating material.

6. A method for applying a roof coating composition to a roof, comprising the steps of:

a. applying onto said roof a sprayable roof coating material comprising:

i. a latex emulsion;

ii. an ingredient consisting of mineral fillers; and iii. recycled rubber particles sized from about a #20 mesh to about a #5 mesh wherein the length of said particles is up to about ½-inch long;

iv. wherein said sprayable roof coating material has a pH of about 11; and b. applying onto said roof coating material a sprayable ionic liquid comprising about 25% by volume citric acid and having a pH opposite to that of said sprayable roof coating material.

* * * * *